July 21, 1931.  C. J. PILLING ET AL  1,815,725

SUTURE FORCEPS

Filed Feb. 3, 1930

INVENTORS:
Charles J. Pilling
and Bruno F. Wiegand
by
ATTORNEY

Patented July 21, 1931

1,815,725

UNITED STATES PATENT OFFICE

CHARLES J. PILLING, OF LANSDOWNE, AND BRUNO F. WIEGAND, OF PHILADELPHIA, PENNSYLVANIA, ASSIGNORS TO THE GEORGE P. PILLING & SON COMPANY, OF PHILADELPHIA, PENNSYLVANIA, A CORPORATION OF PENNSYLVANIA

SUTURE FORCEPS

Application filed February 3, 1930. Serial No. 425,553.

This invention relates to improvements in suture forceps for use in surgical work.

The object of the invention is to provide a novel, simple and efficient forceps by means of which a suture may be passed through the vessel or parts to be ligated without danger of tearing the tissues.

The invention consists of the elements and the combinations of them hereinafter described and claimed.

In the accompanying drawings, illustrating the invention,

Figure 1:
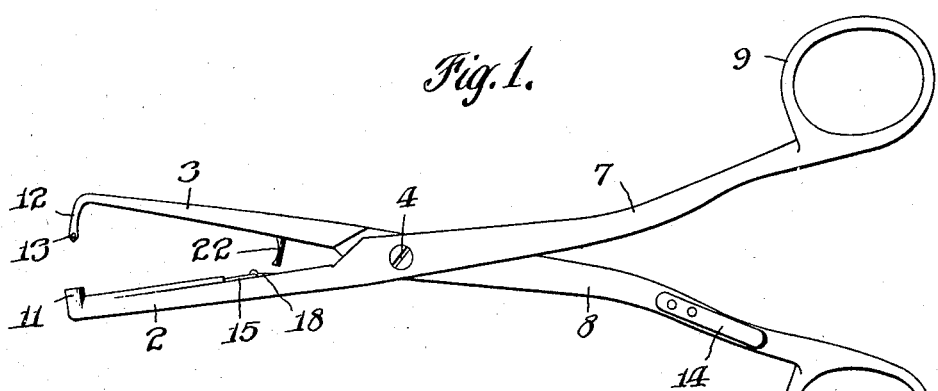
Figure 1 is a side view of a forceps showing one form of embodiment of our invention, and showing the parts of the instrument in the open position.

Referring to the drawings, 2 and 3 designate first and second members, respectively, which are pivoted together, at 4, and which are provided with extensions 7 and 8 having suitable handles 9 and 10, respectively, by means of which the instrument may be handled and manipulated and the members 2 and 3 thereof moved toward and from each other to close and open the instrument in the same manner that forceps generally are closed and opened.

The free end portion of the first member 2 has a tube 11 formed thereon or secured thereto and directed toward the free end of the second member 3; and the free end portion of the second member 3 has a needle 12 formed thereon or secured thereto and directed toward the tube 11. The tube 11 and needle 12 are so relatively disposed on the members 2 and 3 that when the members are moved toward each other the needle will enter the tube, as shown in Figs. 3, 4, 5 and 6, and that when the members are moved away from each other the needle will be withdrawn from within the tube, as shown in Figs. 1 and 2.

Figure 2:
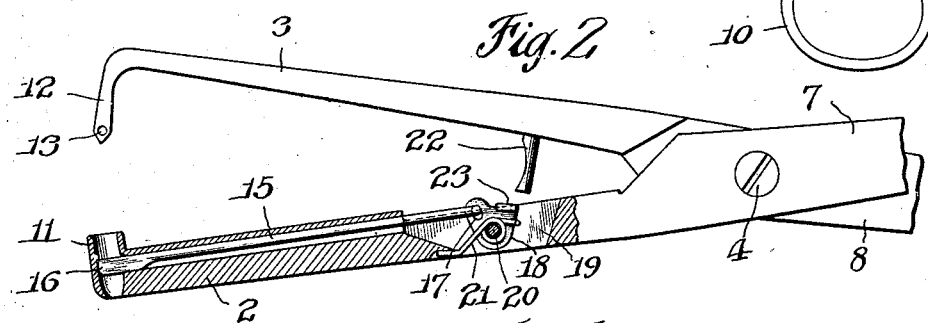
Figure 2 is a side view, enlarged and partly in section of the needle or sewing end portion of the instrument, showing the parts thereof in the open position.

The free or pointed end portion of the needle 12 is provided with an eye 13 through which a suture may be threaded when the instrument is open, as shown in Fig. 1. After the suture has been threaded through the eye 13, the instrument is closed, as shown in Fig. 4, and during the closing thereof the portions of the suture extending from the respective sides of the eye 13 are formed into a loop which is carried into the tube 11 by the needle 12.

The extension 8 of the second member 3 is provided with a flat spring clip 14 between which and the extension 8 one of the end portions of the suture may be tucked to hold it in place while the other end portion is left free to permit the suture to move through the needle eye 13 for a purpose hereinafter appearing.

Figure 3:
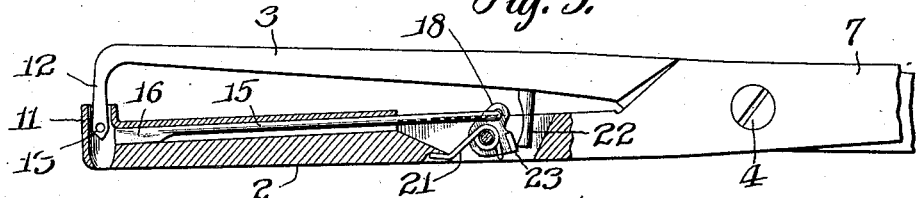
Figure 3 is a view similar to Fig. 2, showing the instrument partially closed.
Figure 4:
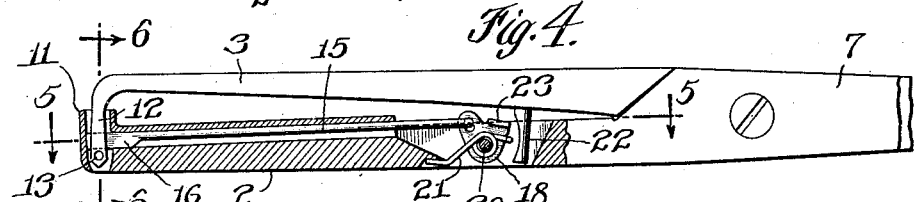
Figure 4 is a view similar to Figs. 2 and 3, showing the instrument completely closed.
Figure 5:
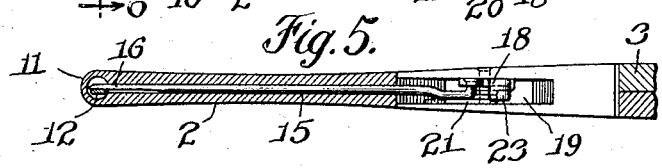
Figure 5 is a longitudinal section through a portion of the instrument, on line 5—5 of Fig. 4.
Figure 6:
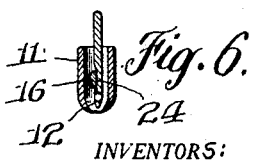
Figure 6 is a transverse section through the instrument, on line 6—6 of Fig. 4.

Slidable longitudinally within an opening in the first member 2 is a suture loop retaining pin or part 15 having a flattened end portion 16 which is adapted to enter the tube 11 when the pin 15 is moved from the position shown in Fig. 3 to the position shown in Fig. 4, and which is adapted to be withdrawn from the tube when the pin is moved back from the position shown in Fig. 4 to the position shown in Fig. 3.

The end of the pin 15 remote from the flattened end portion 16 thereof extends laterally into an opening or slot 17 in a lever 18 which is located within an opening 19 in the first member 2 and fulcrumed on a pin 20 carried by the member 2 and extending transversely through the opening 19. A spring 21 encircling the pin 20 laterally of the lever 18 and having one end thereof acting against the lever and the other end thereof acting against the member 2 holds the lever 18 and pin 15 normally in the operative position shown in Figs. 2 and 4 with the flattened end portion 16 of the pin 15 projected into the tube 11.

The second member 3 is provided with a pin 22 which projects therefrom toward the first member 2 and constitutes an operating element for the lever 18. The lever 18 is provided with a contact part 23 to be engaged by the free end of the pin 22, and the pin 22 and contact part 23 are related so that when the members 2 and 3 are moved toward each other from the open position shown in Fig. 2, the end of the pin 22 will engage the contact part 23 and move the lever 18 and pin 15 back to the position shown in Fig. 3 against the action of the spring 21, as the needle 12 enters the tube 11; and, during the continued movement of the members 2 and 3 toward each other and after the eye 13 of the needle 12 passes the path of the flattened end portion 16 of the pin 15, and immediately before the members 2 and 3 reach the final closed position, shown in Fig. 4, the pin 22 will escape the contact part 23 of the lever 18 and thereby free the lever and permit the spring 21 to return it and the pin 15 to the position shown in Figs. 2 and 4. When the instrument is opened, after the closing operation above described, the free end portion of the pin 22 will spring slightly toward the pivot 4 as it engages the lever 18 while being returned to its position above the contact part 23 of the lever.

When the flattened end 16 of the pin 15 is projected into the tube 11 it crosses the needle 12 and moves in close proximity thereto and through a lateral depression 24 therein, so that it will be projected through a suture loop carried into the tube 11 by the needle.

In using the instrument the surgeon threads a suture through the eye 13 of the needle 12 and extends the ends of the suture back in the region of the handles 9 and 10, and, if desired, tucks one end portion under the holding clip 14. He then applies the instrument to the part or parts to be ligated by grasping the same between the needle 12 and tube 11 and closing the instrument tightly. After the instrument has been tightly closed, it is immediately re-opened. During the closing of the instrument, the needle 12 penetrates the part or parts to be ligated and carries a loop of the suture therethrough and into the tube 11, and the pin 22 acts upon the lever 18 and operates it to withdraw the flattened end portion 16 of the pin 15 from within the tube 11 as shown in Fig. 3. Just before the members 2 and 3 reach the completely closed position shown in Fig. 4, the pin 22 escapes the lever 18 and permits the spring 21 to project the pin 15 to the position shown in Fig. 2, causing the flattened end 16 of the pin 15 to be projected through the suture loop carried into the tube 11 by the needle 12. Now, when the instrument is re-opened, the end 16 of the pin 15 retains the suture loop within the tube 11 while the needle 12 is being withdrawn from the tissues, leaving the suture extending through the same. After the instrument has been thus re-opened, the suture is released therefrom, one end thereof is drawn through the tissues and the suture is tied in the usual manner.

Our improved instrument is particularly adapted for use in controlling bleeding in the tonsillar fossa, as it may be readily introduced thereto when it is desired to ligate the same.

The instrument may, however, be made in the proper sizes for use in abdominal and pelvic work.

We claim as our invention:

1. A forceps comprising first and second connected members movable toward and from each other, a tube on an end portion of said first member directed toward said second member, a needle extending fixedly from an end portion of said second member and directed toward said tube and being adapted to enter the same when the members are moved toward each other, said needle having an eye in its free end portion adapted to receive a suture and carry a loop thereof into the tube when the members are moved toward each other, a retaining part carried by said first member and adapted to be moved across the needle and through a suture loop carried thereby when the needle is within the tube, and means for automatically moving said part across the needle and through a suture loop carried thereby when the members are moved toward each other.

2. A forceps comprising first and second connected members movable toward and from each other, a tube on an end portion of said first member directed toward said second member, a needle extending fixedly from an end portion of said second member and directed toward said tube and being adapted to enter the same when the members are moved toward each other, said needle having an eye in its free end portion adapted to receive a suture and carry a loop thereof into the tube when the members are moved toward each other, a retaining part carried by said first member and movable within the tube and across the needle and through a suture loop carried thereby when the needle is within the tube, yielding means tending to move said part to an operative position across the needle and means operated by said members when they are moved toward each other to move said part away from said operative position and thereafter release it after the needle enters the tube and crosses the path of said part.

3. A forceps comprising first and second connected members movable toward and from each other, a tube on an end portion of said first member directed toward said second member, a needle extending fixedly from an end portion of said second member and directed toward said tube and being adapted to enter the same when the members are moved toward each other, said needle having an eye in its free end portion adapted to receive a suture and carry a loop thereof into the tube when the members are moved toward each other, a retaining part slidable longitudinally within an opening in said first member and adapted to be moved into the tube and across the needle and through a suture loop carried thereby when the needle is within the tube, a lever fulcrumed on said first member and connected to said part yielding means acting upon said part and said lever and tending to move said part into the tube to an operative position across the needle and means carried by said second member and adapted to engage said lever and operate it to move said part away from said operative position and thereafter release said lever after the needle enters the tube and crosses the path of said part when the members are moved toward each other.

4. A forceps comprising first and second connected members movable toward and from each other, a tube on an end portion of said first member directed toward said second member, a needle extending fixedly from an end portion of said second member and directed toward said tube and being adapted to enter the same when the members are moved toward each other, said needle having an eye in its free end portion adapted to receive a suture and carry a loop thereof into the tube when the members are moved toward each other, a retaining part slidable longitudinally within an opening in said first member and adapted to be moved into the tube and across the needle and through a suture loop carried thereby when the needle is within the tube, a lever fulcrumed on said first member and connected to said part, yielding means acting upon said part and said lever and tending to move said part into the tube to an operative position across the needle, an operating element projecting from said second member and adapted to cross the axis of the lever fulcrum when the members are moved toward each other, said lever having a contact part in the path of said element when said part is in said operative position and the members are moved toward each other and said element being adapted to engage said lever and operate it to move said part away from said operative position and thereafter release said lever after the needle enters the tube and crosses the path of said part and after said element crosses the axis of the lever fulcrum when said members are moved toward each other, said element being yieldable to permit it to clear the contact part of the lever when the members are moved away from each other.

5. A forceps comprising first and second connected members movable toward and from each other, a tube on an end portion of said first member directed toward said second member, a needle extending fixedly from an end portion of said second member and directed toward said tube and being adapted to enter the same when the members are moved toward each other, said needle having an eye in its free end portion adapted to receive a suture and carry a loop thereof into the tube when the members are moved toward each other, a retaining part carried by said first member and adapted to be moved across the needle and through a suture loop carried thereby when the needle is within the tube, said needle having a depression therein adapted to be entered by the retaining part when it is moved across the needle and means for automatically moving said part across the needle and through a suture loop carried thereby when the members are moved toward each other.

In testimony whereof, we affix our signatures hereto.

CHARLES J. PILLING.
BRUNO F. WIEGAND.